(12) United States Patent
Guerin et al.

(10) Patent No.: US 10,975,598 B2
(45) Date of Patent: *Apr. 13, 2021

(54) LOCKING SYSTEM EQUIPPED WITH A HANDLE AND WITH A REMOTELY SITUATED INERTIAL SYSTEM

(71) Applicant: U-Shin Italia S.p.A., Pianezza (IT)

(72) Inventors: Anthony Guerin, Pianezza (IT); Siavash Ostovari-Far, Pianezza (IT); Antonio Rocci, Pianezza (IT); Simone Ilardo, Pianezza (IT)

(73) Assignee: U-Shin Italia S.p.A., Pianezza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 16/798,960

(22) Filed: Feb. 24, 2020

(65) Prior Publication Data
US 2020/0190865 A1 Jun. 18, 2020

Related U.S. Application Data

(63) Continuation of application No. PCT/EP2018/072307, filed on Aug. 17, 2018.

(30) Foreign Application Priority Data

Aug. 23, 2017 (EP) ..................................... 17187576

(51) Int. Cl.
*E05B 77/06* (2014.01)
*E05B 85/10* (2014.01)
(Continued)

(52) U.S. Cl.
CPC ............ *E05B 77/06* (2013.01); *E05B 85/103* (2013.01); *E05B 85/16* (2013.01); *B60J 5/04* (2013.01);
(Continued)

(58) Field of Classification Search
CPC .......... E05B 77/04; E05B 77/06; E05B 85/10; Y10S 292/22; Y10S 292/31
See application file for complete search history.

(56) References Cited

U.S. PATENT DOCUMENTS 2,317,699 A * 4/1943 Thompson .............. E05B 85/22
292/166
2,317,700 A * 4/1943 Thompson .............. E05B 85/12
292/254
(Continued)

FOREIGN PATENT DOCUMENTS

DE 102011115009 A1 * 4/2012 ............. E05B 77/06
EP 1593802 A1 * 11/2005 ............. E05B 77/06
(Continued)

OTHER PUBLICATIONS

International Search Report for International Application PCT/EP2018/072307, dated Oct. 31, 2018.

*Primary Examiner* — Carlos Lugo
(74) *Attorney, Agent, or Firm* — Burris Law, PLLC

(57) ABSTRACT

A locking system for an opening leaf of a motor vehicle includes an opening leaf and a handle which contains a framework which is designed to be fixed to the opening leaf, a grab lever which commands the opening of a lock of the opening leaf, a grab element which is arranged on an exterior side of the opening leaf and which is designed to allow a user to actuate the grab lever, the grab element being longitudinally delineated by a front end and a rear end, at least one first inertial security system which is mounted on the framework and which contains a rocker which bears an inertial mass, wherein the axis of rotation of the grab lever extends vertically overall at the front of the front end of the grab element, the inertial mass being arranged longitudinally forward of the axis of rotation of the grab lever.

8 Claims, 5 Drawing Sheets

(51) Int. Cl.
    *E05B 85/16*     (2014.01)
    *B60J 5/04*     (2006.01)
    *E05B 77/04*     (2014.01)

(52) U.S. Cl.
    CPC .............. *E05B 77/04* (2013.01); *E05B 85/10* (2013.01); *E05Y 2900/531* (2013.01); *Y10S 292/22* (2013.01)

(56) References Cited

U.S. PATENT DOCUMENTS

| | | | | |
|---|---|---|---|---|
| 6,218,933 | B1 * | 4/2001 | Josserand | E05B 81/78 340/426.28 |
| 6,363,577 | B1 * | 4/2002 | Spitzley | E05B 79/06 16/438 |
| 6,709,033 | B2 * | 3/2004 | Jooss | E05B 77/06 16/412 |
| 7,036,855 | B2 * | 5/2006 | Lin | E05B 85/16 292/216 |
| 7,070,216 | B2 * | 7/2006 | von zur Muehlen | E05B 77/06 292/336.3 |
| 7,232,164 | B2 * | 6/2007 | Lee | E05B 77/06 292/336.3 |
| 7,635,151 | B2 * | 12/2009 | Rodawold, Jr. | E05B 77/06 292/336.3 |
| 8,857,866 | B2 * | 10/2014 | Savant | E05B 77/06 292/336.3 |
| 8,894,108 | B2 * | 11/2014 | Corwin | E05B 77/06 292/336.3 |
| 9,322,191 | B2 * | 4/2016 | Muller | E05B 85/107 |
| 9,567,777 | B1 | 2/2017 | Vandenbrink | |
| 10,280,658 | B2 * | 5/2019 | Halliwell | E05B 85/107 |
| 10,501,967 | B2 * | 12/2019 | Brown | B60J 5/0415 |
| 2006/0038418 | A1 * | 2/2006 | Huizenga | E05B 79/20 292/336.3 |
| 2007/0069532 | A1 | 3/2007 | Tenorio et al. | |
| 2011/0163554 | A1 * | 7/2011 | Patel | E05B 77/06 292/216 |
| 2014/0145454 | A1 * | 5/2014 | Da Deppo | E05B 77/06 292/336.3 |
| 2015/0061305 | A1 * | 3/2015 | Inai | E05B 85/16 292/336.3 |
| 2016/0097222 | A1 * | 4/2016 | Niegeloh | E05B 85/10 292/336.3 |
| 2018/0002954 | A1 * | 1/2018 | Uemura | E05B 77/06 |
| 2020/0190866 | A1 * | 6/2020 | Guerin | E05B 85/103 |

FOREIGN PATENT DOCUMENTS

| | | | | |
|---|---|---|---|---|
| EP | 3078793 | A1 * | 10/2016 | ........... E05B 85/103 |
| EP | 3106596 | | 12/2016 | |
| JP | 6010041 | Y2 * | 3/1994 | |
| WO | 2004042177 | | 5/2004 | |
| WO | 2006003197 | | 1/2006 | |
| WO | 2010142607 | | 12/2010 | |

* cited by examiner

LOCKING SYSTEM EQUIPPED WITH A HANDLE AND WITH A REMOTELY SITUATED INERTIAL SYSTEM

CROSS-REFERENCE TO RELATED APPLICATIONS

This application is a continuation of International Application No. PCT/EP2018/072307, filed on Aug. 17, 2018, which claims priority to and the benefit of EP 17187576.8, filed on Aug. 23, 2017. The disclosures of the above applications are incorporated herein by reference.

FIELD

The present disclosure relates to a locking system having a door leaf and an opening handle associated with an offset inertial safety system.

BACKGROUND

The statements in this section merely provide background information related to the present disclosure and may not constitute prior art.

There is known a handle for a motor vehicle door leaf which includes a frame fastened to the door leaf, a gripping lever and a transmission lever.

The gripping lever comprises a gripping element which is arranged on the outer side of the door leaf to enable the gripping thereof by a user in order to open the door leaf.

The gripping lever is mounted movable in rotation relative to the frame about a first axis, between at least one rest position and a control position for the opening of a lock of the door leaf.

Also, the transmission lever is pivotally mounted relative to the frame about a second axis of rotation, between a rest position and an actuation position in which the transmission lever actuates the opening of the lock, the transmission lever being driven in rotation by the gripping lever.

For safety concerns, it is known to associate an inertial safety system with the handle to avoid inadvertent actuation of the handle in the event of an impact of the vehicle.

In particular, there is known an inertial safety system which is described in document WO2004/042177.

This inertial safety system includes a rocker which extends from a first end which carries an inertial mass, up to a second end which forms a blocking finger.

The rocker is pivotally mounted between a rest position and a blocking position in which the blocking finger of the rocker is positioned on the path of the actuation lever so that the blocking finger cooperates with a blocking face of the actuation lever to prevent the rotation of the transmission lever, and therefore the opening of the door leaf.

The pivoting of the rocker is caused by the acceleration force that is applied on the inertial mass in the event of an impact against the vehicle.

Although the handle described in document WO2004/042177 has an effective inertial system, the reactivity of the inertial system can be improved.

SUMMARY

This section provides a general summary of the disclosure and is not a comprehensive disclosure of its full scope or all of its features.

The present disclosure provides to a locking system for a door leaf of a motor vehicle comprising a door leaf which extends longitudinally, in a vertical plane, from a front edge up to a rear edge, the door leaf comprising a central area which is interposed longitudinally between the front edge and the rear edge, and the locking system including a handle which comprises a frame which is adapted to be fastened on the door leaf, a gripping lever which is mounted movable in rotation relative to the frame about a first axis, between at least one rest position and a control position for opening a lock of the door leaf, and a gripping element which is arranged on an outer side of the door leaf and which is designed so as to enable a user to actuate the gripping lever, the gripping element being longitudinally delimited by a front end and a rear end.

The locking system further comprises a transmission lever which is pivotally mounted relative to the frame about a second axis of rotation, between a rest position and an actuation position in which the transmission lever actuates the opening of the lock, the transmission lever being driven in rotation by the gripping lever, and at least one first inertial safety system which is mounted on the frame and which includes a rocker which carries an inertial mass, the rocker being pivotally mounted between a rest position and a blocking position in which the rocker inhibits the rotation of the transmission lever, in the event of an impact (also referred to herein as an "impact event"), wherein the inertial mass is longitudinally arranged at the front of the front end of the gripping element.

The position of the inertial mass at the front of the gripping element allows approaching the inertial mass towards the central area of the door leaf.

Yet, it is noticed that during a violent impact of the vehicle against an obstacle, the central area of the door leaf is deformed with more velocity than the periphery of the door leaf, due to the greater flexibility of the central area of the door leaf with respect to the periphery of the door leaf.

In other words, the central area of the door leaf has a higher acceleration than the periphery of the door leaf, promoting the reactive drive of the rocker of the safety system.

Thus, the closer the inertial mass of the inertial safety system is arranged to the central area of the door leaf, the more reactive the inertial safety system will be in blocking the opening of the opening mechanism of the door leaf.

According to another feature, the axis of rotation of the gripping lever extends generally vertically at the front of the front end of the gripping element, the inertial mass being longitudinally arranged at the front of the axis of rotation of the gripping lever.

This arrangement of features makes it possible to approach the inertial mass towards the central area of the door leaf.

According to another feature, the inertial mass is longitudinally arranged between the central area of the door leaf and the axis of rotation of the gripping lever.

This arrangement of features also makes it possible to approach the inertial mass towards the central area of the door leaf.

According to another feature, the gripping element has an elongated shape which longitudinally extends from its front end up to its rear end.

According to another feature, the second axis of rotation of the transmission lever extends transversely, perpendicular to the axis of rotation of the gripping lever.

According to another feature, the rocker extends longitudinally, from a rear end, up to a front end which carries the inertial mass and which comprises a blocking finger designed so as to cooperate with a blocking face delimited by the transmission lever to oppose the rotation of the transmission lever in the event of an impact, the rocker being pivotally mounted about a third vertical axis of rotation which is interposed between the rear end and the front end of the rocker.

According to another feature, the leaf door is delimited by an outer face which is intended to be arranged outside the vehicle, the gripping element being flush with the outer face of the door leaf when the gripping lever occupies its rest position.

According to another feature, the handle includes a second inertial safety system including a rocker which carries an inertial mass, the rocker being pivotally mounted between a rest position and a blocking position in which the rocker inhibits the rotation of the transmission lever, in the event of an impact, the inertial mass of the second safety system being arranged longitudinally at the front of the front end of the gripping element, and in that each of the second safety system and the first safety system is designed so as to be activated in response to a different range of impact intensities.

This feature enables a locking system which has a wide range of use.

The present disclosure also concerns a door handle adapted to equip a locking system of the type previously described.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
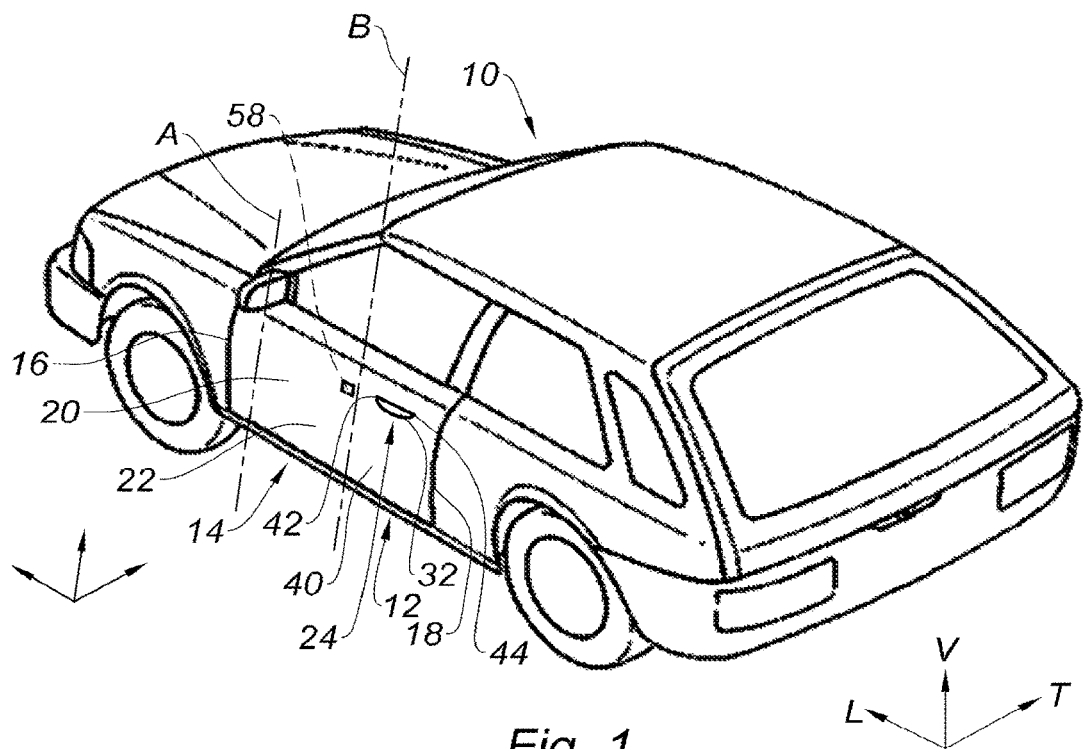
FIG. 1 is a schematic perspective view illustrating a handle and a door leaf of a motor vehicle belonging to the locking system according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the present application, the terms "top", "bottom", "upper", "lower", "horizontal", "vertical", and their derivatives refer to the position or to the orientation of an element or of a component, this position or this orientation being considered when the vehicle is in a service configuration on a horizontal ground.

In addition, to clarify the description and the claims, the longitudinal, vertical and transverse terminology will be adopted without limitation, with reference to the trihedron L, V, T indicated in the figures.

In all of these figures, identical or similar references represent identical or similar members or sets of members.

It should be noted that in the present disclosure, the terms "front" and "rear" should be understood with respect to the general longitudinal direction of the vehicle, that is to say from the left to the right of FIG. 1.

There is represented in FIG. 1 a motor vehicle 10 which is equipped with a locking system 12 for a door leaf, according to the present disclosure.

The locking system 12 comprises a door leaf 14 which extends longitudinally, in a vertical plane, from a front edge 16 up to a rear edge 18, the door leaf 14 comprising a central area 20 which is interposed longitudinally between the front edge 16 and the rear edge 18.

The door leaf 14 is delimited by a trimming outer face 22 which is arranged outside the vehicle.

Also, the door leaf 14 is pivotally mounted between a closed position, illustrated in FIG. 1, and an open position, about an opening axis A which extends vertically, in the vicinity of the front edge 16 of the door leaf 14.

Figure 2:
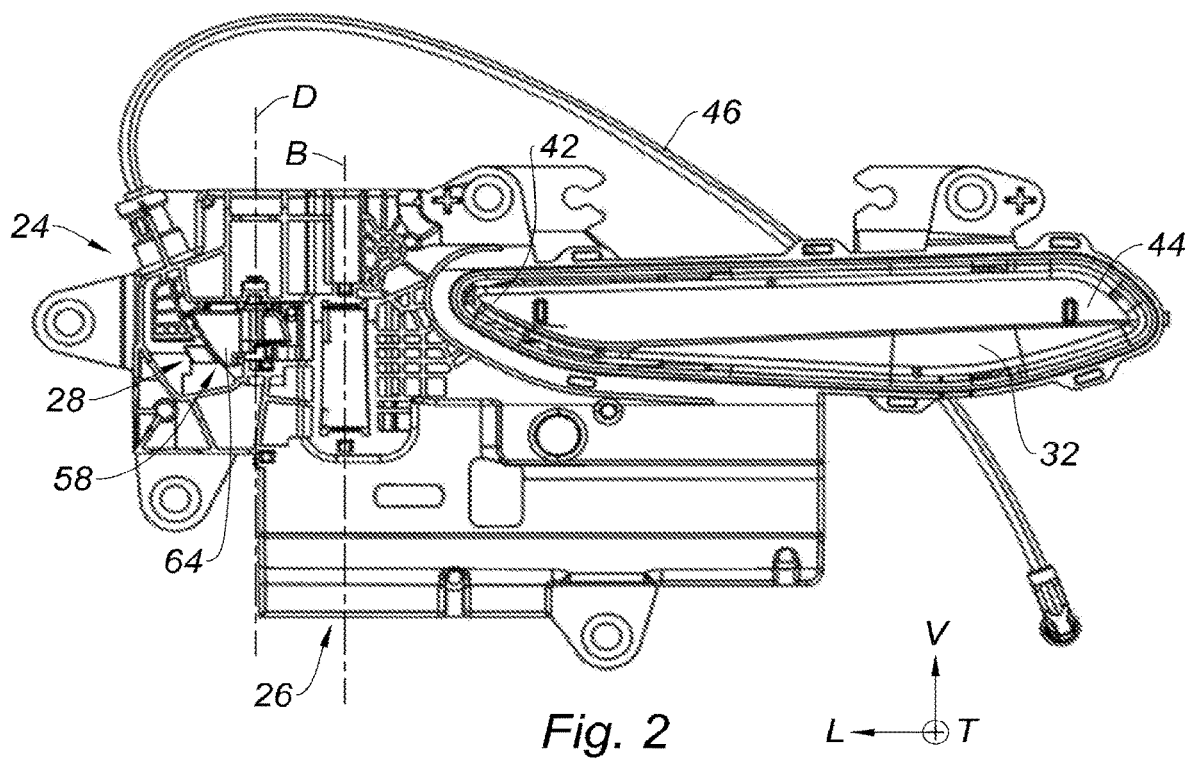
FIG. 2 is a front view illustrating the gripping lever of the handle of FIG. 1 in its rest position and a first inertial safety system, with the frame of the handle.
Figure 3:
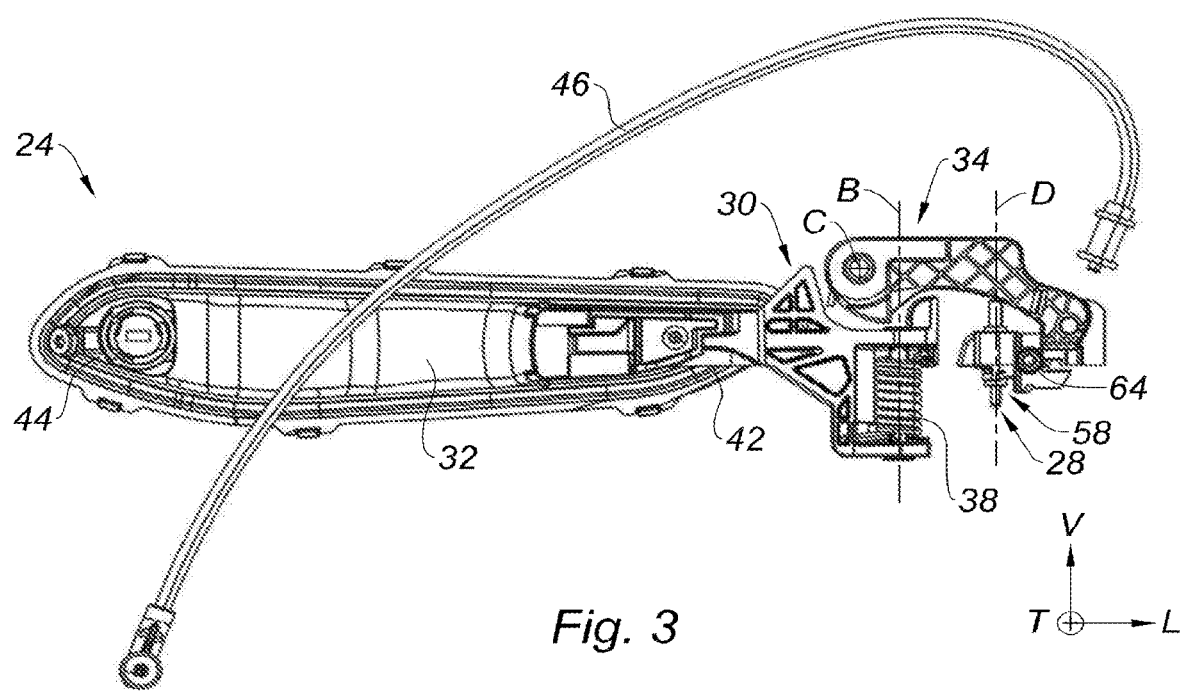
FIG. 3 is a rear view illustrating the transmission lever in its rest position, without the frame.
Figure 4:
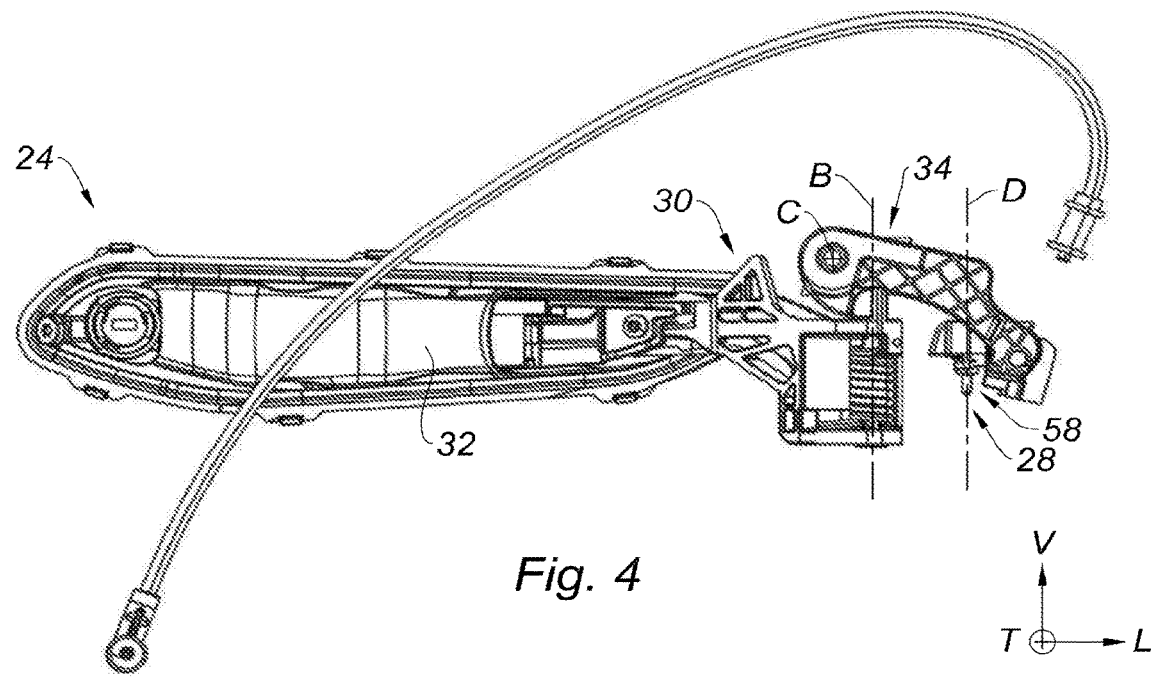
FIG. 4 is a rear view illustrating the transmission lever in its actuation position, without the frame.

Referring to FIGS. 2 to 4, the locking system 12 includes a handle 24 which comprises a frame 26, a mechanism for opening a lock 36 of the door leaf 14, and a first inertial safety system 28 which aims at preventing the inadvertent opening of the door leaf 14 in the event of a violent impact of the motor vehicle 10 against an obstacle.

The frame 26 generally has the shape of a plate which extends in the plane of the door leaf 14 and which is fastened to a structure (not represented) of the door leaf by screws (not represented) for example.

The opening mechanism of the lock 36 includes a gripping lever 30, a gripping element 32 and a transmission lever 34.

Figure 5:
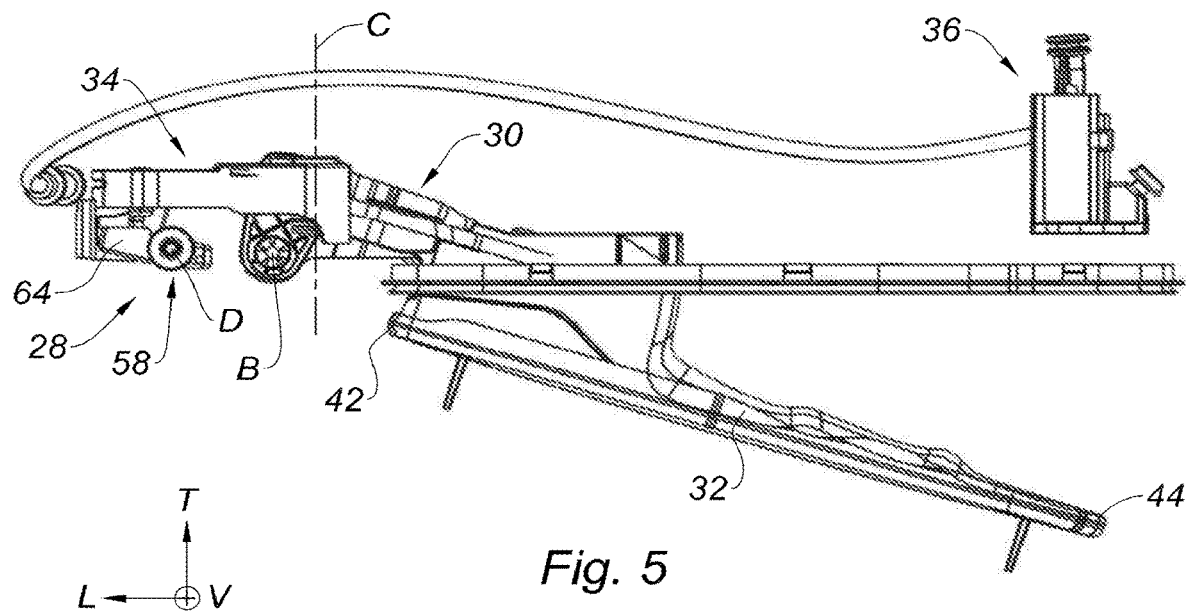
FIG. 5 is a top view, illustrating the transmission lever in its control position, without the frame.

The gripping lever 30 is mounted movable in rotation relative to the frame 26 about a first vertical axis B of rotation, between a rest position illustrated in FIGS. 2 and 3, and a control position for the opening of the lock 36 of the door leaf 14, illustrated in FIGS. 4 and 5.

The gripping lever 30 is resiliently biased towards its rest position by a helical spring 38 which extends vertically about the axis B of rotation of the gripping lever and which is connected to the frame 26.

In a complementary manner, the gripping element 32 is designed so as to enable a user to actuate the gripping lever 30.

To this end, as shown in FIG. 1, the gripping element 32 is arranged on an outer side of the door leaf 14, within a housing 40 formed by the outer face 22 of the door leaf 14, the gripping element 32 being secured to the gripping lever 30 to drive the gripping lever 30 in rotation when the user actuates the gripping element 32.

The gripping element 32 has an elongated handle shape which extends longitudinally from a front end 42 up to its rear end 44.

It should be noted that the gripping element 32 is represented without its trimming cap in FIGS. 2, and 4 to 6, which trimming cap is flush with the outer face 22 of the door leaf when the gripping lever 30 occupies its rest position.

Also, the gripping lever 30 is arranged so as to drive the transmission lever 34 in movement, in order to actuate the opening of the lock of the door leaf 14.

For this purpose, the transmission lever 34 is pivotally mounted relative to the frame 26 about a second transverse axis C of rotation, between a rest position illustrated in FIGS. 2 and 3, and an actuation position illustrated in FIGS. 4 and 5, in which the transmission lever 34 actuates the opening of the lock of the door leaf 14.

Figure 6:
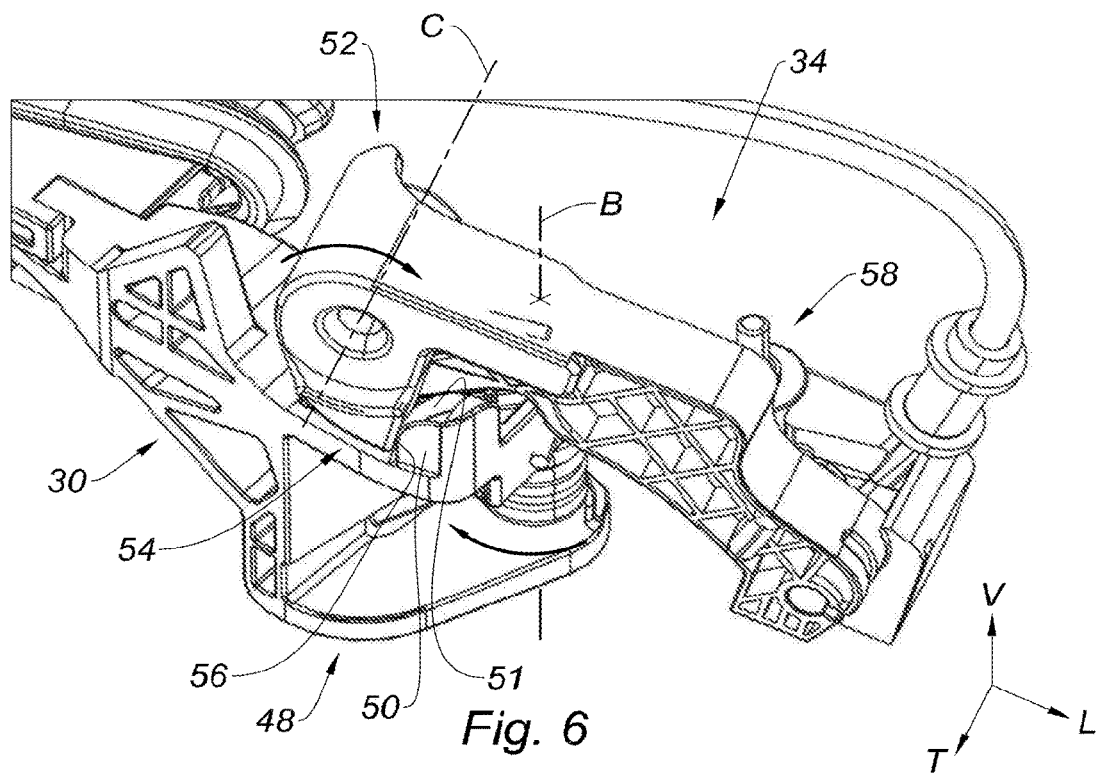
FIG. 6 is a detailed perspective view illustrating the gripping lever in its control position and the transmission lever in its actuation position.

In addition, with reference to FIG. 6, the front end 48 of the gripping lever 30 defines a cam 50 which has a profile 51 generally in the shape of a spherical portion.

Complementarily, the rear end 52 of the transmission lever 34 includes a follower 54 delimiting a bearing face 56 which extends transversely opposite the cam 50.

The cam 50 and the follower 54 are arranged so as to transform the rotational movement of the gripping lever 30 about its vertical axis B, into a rotational movement of the transmission lever 34 about its transverse axis C.

According to a form of the present disclosure, the handle 24 is a handle of the flush type, also called a "flush" handle, that is to say that the gripping element 32 is flush with the outer face 22 of the door leaf 14 and visually merges with the outer face 22 of the door leaf 14 when the gripping lever 30 occupies its rest position.

This type of handle 24 is described in the document EP-A1-3106596 to which reference should be made for more details.

Figure 11:
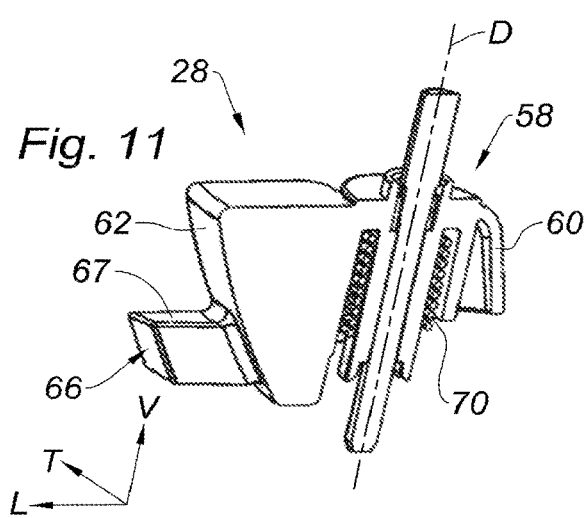
FIG. 11 is a detailed perspective view and in longitudinal section illustrating the rocker.
Figure 12:
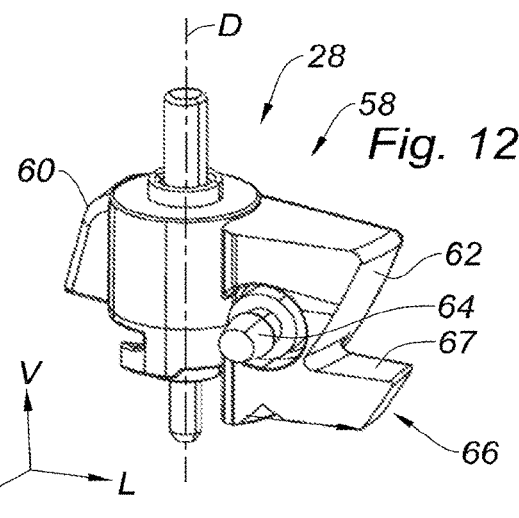
FIG. 12 is a detailed perspective view illustrating the rocker.

According to another aspect, the first inertial safety system 28 includes a rocker 58 represented in detail in FIGS. 11 and 12, which extends longitudinally, from a rear end 60, up to a front end 62 which carries an inertial mass 64.

The front end 62 of the rocker 58 comprises a blocking finger 66 which projects longitudinally towards the front and which delimits a blocking face 67 extending radially, and in one form the blocking finger 66 extends perpendicularly to the axis D of rotation of the rocker 58.

Figure 10:
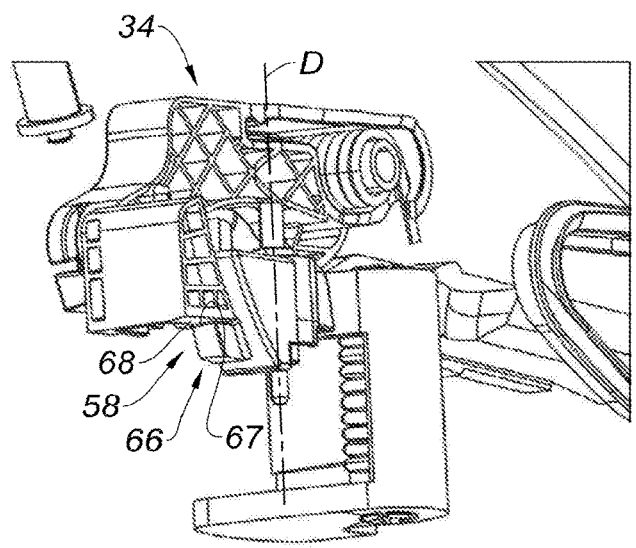
FIG. 10 is a detailed perspective view illustrating the rocker in its blocking position and the transmission lever in a blocked position.

The blocking face 67 of the rocker 58 is designed so as to cooperate with a blocking face 68 delimited by the transmission lever 34, which extends generally parallel to the blocking face 67 of the rocker 58, to oppose the rotation of the transmission lever 34 from its rest position towards its actuation position, in the event of an impact of the vehicle, as shown in FIG. 10.

Figure 7:
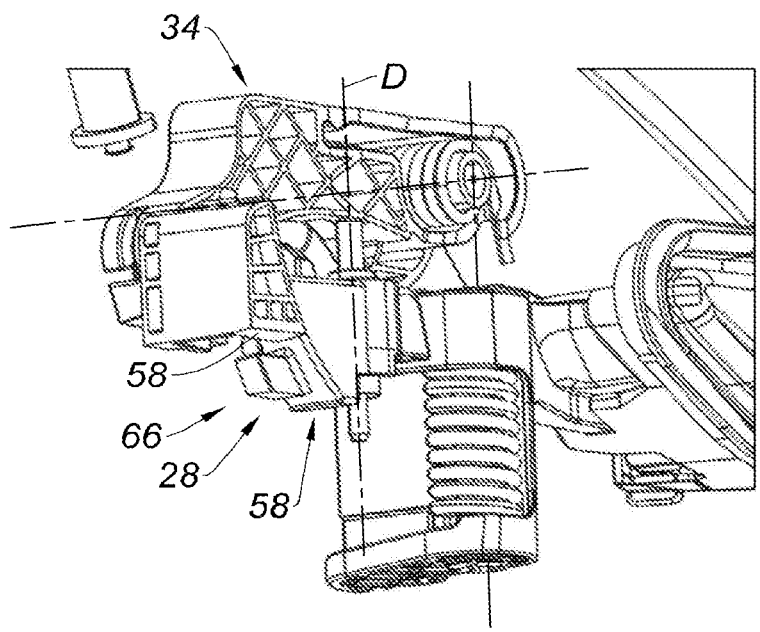
FIG. 7 is a detailed perspective view illustrating the rocker in its rest position and the transmission lever in its rest position.
Figure 8:
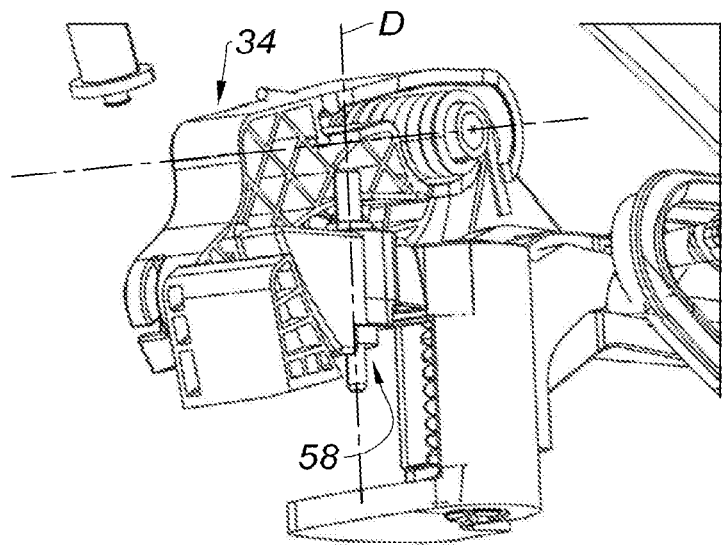
FIG. 8 is a detailed perspective view illustrating the rocker in its rest position and the transmission lever in its actuation position.
Figure 9:
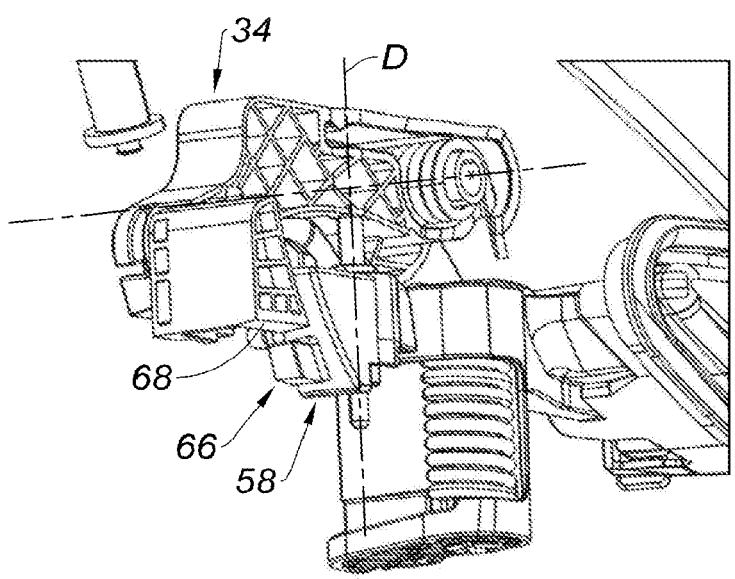
FIG. 9 is a detailed perspective view illustrating the rocker in its blocking position and the transmission lever in its rest position.

To this end, the rocker 58 is pivotally mounted about a third vertical axis D of rotation, between a rest position illustrated in FIGS. 7 and 8, and a blocking position illustrated in FIGS. 9 and 10, in which the blocking finger 66 of the rocker 58 is positioned on the path of the transmission lever 34, so that the blocking face 68 of the transmission lever 34 strikes the blocking finger of the rocker 58 to prevent the rotation of the transmission lever 3, so as to block the opening of the door leaf 14.

The axis D of rotation of the rocker 58 is interposed between the rear end 60 and the front end 62 of the rocker 58.

According to a form of the present disclosure, the first inertial safety system 28 is a reversible system, that is to say that the rocker 58 temporarily occupies its blocking position, to enable the opening of the door leaf 14 in a short time following the actuation of the first inertial safety system 28.

With reference to FIG. 11, the rocker 58 is equipped with a helical spring 70 which extends about the axis D of rotation of the rocker 58 and which cooperates with the frame to resiliently bias the rocker 58 from its blocking position towards its rest position.

Thus, the rocker 58 is resiliently biased into its initial rest position when the acceleration applied to the rocker 58 becomes zero.

The rocker 58 is designed so as to be driven from its rest position up to its blocking position when the acceleration of the inertial mass 64 is comprised within a first range of values comprised between 5G and 15G for example, the unit G of acceleration amounting to $9.80665$ m·s$^{-2}$.

The first inertial safety system 28 is therefore very reactive and quick to pass into a blocking position.

According to another aspect of the present disclosure, the inertial mass 64 of the rocker 58 is arranged longitudinally at the front of the front end 42 of the gripping lever 30, as shown in FIGS. 2, 3, and 5.

More particularly, the inertial mass 64 of the rocker 58 is arranged longitudinally at the front of the axis B of rotation of the gripping lever 30, the axis B of rotation of the gripping lever 30 being arranged at the front of the front end 42 of the gripping lever 30.

In general, with reference to FIG. 1, the inertial mass 64 is arranged longitudinally between the central area 20 of the door leaf 14 and the axis of rotation B of the gripping lever 30.

Indeed, it can be noticed that during a violent impact of the vehicle against an obstacle, the central area 20 of the door leaf 14 is deformed at a higher velocity than the periphery of the door leaf 14, due to the greater flexibility of the central area 20 of the door leaf 14 with respect to the periphery of the door leaf 14.

Thus, the closer the inertial mass 64 of the first inertial safety system 28 is arranged to the central area 20 of the door leaf 14, the more reactive the first inertial safety system 28 will be in blocking the opening of the opening mechanism of the door leaf 14.

Figure 13:
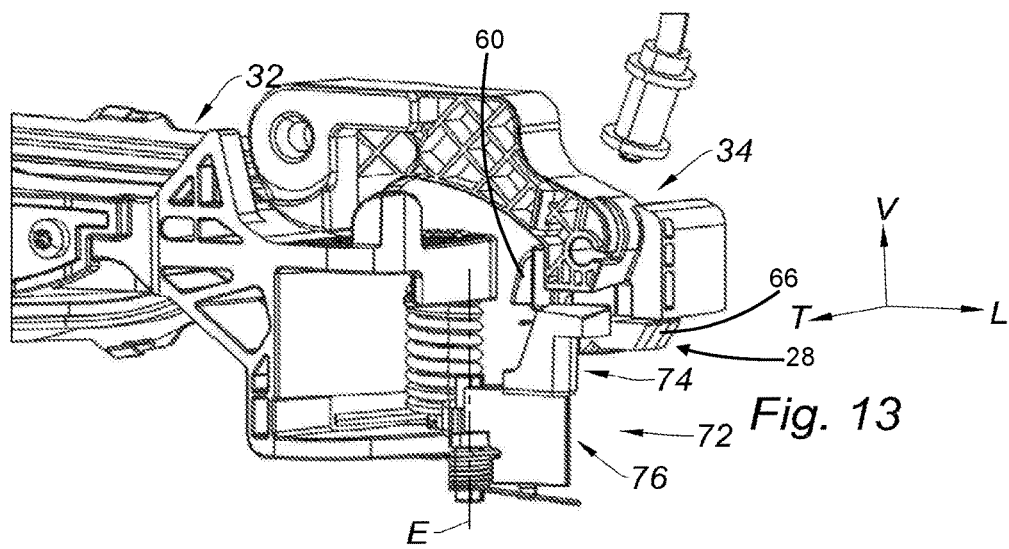
FIG. 13 is a detailed perspective view illustrating a second inertial safety system according to the present disclosure.

According to an alternative form of the present disclosure represented in FIG. 13, the handle 24 includes a second inertial safety system 72 which comprises a rocker 74 which carries an inertial mass 76.

The rocker 74 is pivotally mounted about a vertical axis E of rotation, between a rest position illustrated in FIG. 13, in which the rocker enables the rotation of the transmission lever 34 up to its actuation position, and a blocking position (not represented) in which the rocker 74 inhibits the rotation of the transmission lever 34, in the event of an impact.

The inertial mass 76 of the second inertial safety system 72 is arranged longitudinally at the front of the front end 42 of the gripping element 32, for the same reasons previously described for the first inertial safety system 28.

In addition, each of the second inertial safety system 72 and the first inertial safety system 28 is designed so as to be activated in response to a different range of impact intensities.

In another form of the present disclosure, the second inertial safety system 72 is a system of the irreversible type, that is to say that the rocker 74 remains in its blocking position after having undergone an acceleration.

This type of irreversible inertial system is described in particular in the document WO2006003197 to which reference should be made for more details, and the contents of which are incorporated herein by reference in its entirety.

The present description is provided as a non-limiting example.

It will be understood that simple mechanical reversals are covered by the present disclosure.

For example, the rocker 58 of the first inertial safety system 28 may indifferently block the rotation of the gripping lever 30, only the rotation of the transmission lever 34, or any other element of the kinematic chain of the opening of the door leaf 14.

The axis D of rotation of the rocker 58 of the first inertial safety system, the axis B of rotation of the gripping lever 30 and the axis E of rotation of the rocker 74 of the second inertial safety system are all parallel.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A locking system for a door leaf of a motor vehicle comprising the door leaf which extends longitudinally, in a vertical plane, from a front edge up to a rear edge, the door leaf comprising a central area which is interposed longitudinally between the front edge and the rear edge, and the locking system including a handle which comprises:
   a frame adapted to be fastened on the door leaf;
   a gripping lever mounted movable in rotation relative to the frame about a first axis of rotation, between at least a rest position and a control position for opening a lock of the door leaf;
   a gripping element arranged on an outer side of the door leaf and configured so as to enable a user to actuate the gripping lever, the gripping element being delimited longitudinally by a front end and a rear end, wherein, the front end of the gripping element is secured to the gripping lever to drive the gripping lever in rotation when the rear end of the gripping element is actuated;
   a transmission lever pivotally mounted relative to the frame about a second axis of rotation, between a rest position and an actuation position in which the transmission lever actuates the opening of the lock, the transmission lever being driven in rotation by the gripping lever; and
   a first inertial safety system mounted on the frame and including a rocker which carries an inertial mass, the rocker being pivotally mounted between a rest position and a blocking position in which the rocker inhibits the rotation of the transmission lever, in an impact event,
   wherein the first axis of rotation of the gripping lever extends vertically at the front of the front end of the gripping element, the inertial mass being arranged longitudinally in front of the first axis of rotation of the gripping lever, and
   wherein the first axis of rotation extends substantially perpendicular with respect to the second axis of rotation.

2. The locking system according to claim 1, wherein the inertial mass is adapted to be arranged longitudinally between the central area of the door leaf and the first axis of rotation of the gripping lever.

3. The locking system according to claim 1, wherein the gripping element has an elongated shape which extends longitudinally from its front end up to its rear end.

4. The locking system according to claim 1, wherein the rocker extends longitudinally, from a rear end, up to a front end which carries the inertial mass and which comprises a blocking finger designed so as to cooperate with a blocking face delimited by the transmission lever to oppose the rotation of the transmission lever in the impact event, the rocker being pivotally mounted about a third vertical axis of rotation interposed between the rear end and the front end of the rocker.

5. The locking system according to claim 1, wherein the gripping element is adapted to be flush with an outer face of the door leaf when the gripping lever occupies its rest position, the outer face being arranged outside the motor vehicle.

6. The locking system according to claim 1, wherein the handle includes a second inertial safety system including a rocker which carries an inertial mass, the rocker being pivotally mounted between a rest position and a blocking position in which the rocker inhibits the rotation of the transmission lever, in the impact event, the inertial mass of the second inertial safety system being arranged longitudinally at the front of the front end of the gripping element, and in that each of the second inertial safety system and the first inertial safety system are configured so as to be activated in response to a different range of impact intensities.

7. A door handle for a motor vehicle door leaf, the door handle including:
   a frame which adapted to be fastened on the motor vehicle door leaf;
   a gripping lever mounted movable in rotation relative to the frame about a first axis of rotation, between at least a rest position and a control position for opening a lock of the motor vehicle door leaf;
   a gripping element arranged on an outer side of the motor vehicle door leaf and configured so as to enable a user to actuate the gripping lever, the gripping element being delimited longitudinally by a front end and a rear end, wherein the front end of the gripping element is secured to the gripping lever to drive the gripping lever in rotation when the rear end of the gripping element is actuated;
   a transmission lever pivotally mounted relative to the frame about a second axis of rotation, between a rest position and an actuation position in which the transmission lever actuates the opening of the lock, the transmission lever being driven in rotation by the gripping lever; and
   a first inertial safety system mounted on the frame and including a rocker which carries an inertial mass, the rocker being pivotally mounted between a rest position and a blocking position in which the rocker inhibits the rotation of the transmission lever, in an impact event, wherein the first axis of rotation of the gripping lever extends vertically at the front of the front end of the gripping element, the inertial mass being arranged longitudinally in front of the first axis of rotation of the gripping lever, and wherein the first axis of rotation extends substantially perpendicular with respect to the second axis of rotation.

8. A locking system for a door leaf of a motor vehicle comprising the door leaf which extends longitudinally, in a vertical plane, from a front edge up to a rear edge, the door leaf comprising a central area which is interposed longitudinally between the front edge and the rear edge, and the locking system including a handle which comprises:

a frame adapted to be fastened on the door leaf;

a gripping lever mounted movable in rotation relative to the frame about a first axis of rotation, between at least a rest position and a control position for opening a lock of the door leaf;

a gripping element arranged on an outer side of the door leaf and configured so as to enable a user to actuate the gripping lever, the gripping element being delimited longitudinally by a front end and a rear end;

a transmission lever pivotally mounted relative to the frame about a second axis of rotation, between a rest position and an actuation position in which the transmission lever actuates the opening of the lock, the transmission lever being driven in rotation by the gripping lever; and a first inertial safety system mounted on the frame and including a rocker which carries an inertial mass, the rocker being pivotally mounted between a rest position and a blocking position in which the rocker inhibits the rotation of the transmission lever, in an impact event, wherein the first axis of rotation of the gripping lever extends vertically at the front of the front end of the gripping element, the inertial mass being arranged longitudinally in front of the first axis of rotation of the gripping lever, wherein the handle includes a second inertial safety system including a rocker which carries an inertial mass, the rocker being pivotally mounted between a rest position and a blocking position in which the rocker inhibits the rotation of the transmission lever, in the impact event, the inertial mass of the second inertial safety system being arranged longitudinally at the front of the front end of the gripping element, and in that each of the second inertial safety system and the first inertial safety system are configured so as to be activated in response to a different range of impact intensities.

* * * * *